UNITED STATES PATENT OFFICE.

JOHN STREET, OF PHILADELPHIA COUNTY, PENNSYLVANIA.

IMPROVEMENT IN ARTIFICIAL WRITING-SLATES.

Specification forming part of Letters Patent No. 3,345, dated November 21, 1843.

*To all whom it may concern:*

Be it known that I, JOHN STREET, of the incorporation township or district of the Northern Liberties, in the county of Philadelphia and State of Pennsylvania, have invented a new and Improved Writing-Slate; and I do hereby declare that the following is a full and exact description.

The nature of my invention consists in applying a silicious composition to wood for the purpose of forming a wooden writing-slate.

To enable others to make use of my invention, I will proceed to describe the ingredients, composition, and mode of manufacture.

To the proportion of one gallon of linseed-oil add eight ounces of finely-pulverized umber or an equal weight of any of the calces of lead. Mix them together, and boil the mixture over a moderate fire until it assumes a dark chestnut-brown color. Next, to one pint of finely-pulverized silex or any finely-pulverized silicious substance add from one-fourth pint to a half of finely-pulverized potter's clay, as the slates may be required to be more or less soft. To this mixture add as much of the former prepared linseed-oil as will make the whole, when well incorporated, the consistency of common glazier's putty. Color this specified combination with lamp-black ground with spirits of turpentine to the consistency of cream to form black slates, or with Prussian blue ground as above specified to form blue slates, or with vermilion ground as above specified to form red slates, or with chrome or mineral green ground as above specified to form green slates. A variety of tints may be produced by using more or less of each of the colors specified or by an intermixture of the colors. Thin this colored composition with spirits of turpentine, if need be, until it is the consistence of paste. Apply with a spatula a thin and even coat of this preparation to smooth surfaces of wood of any desired size and thickness. Allow this to dry fifteen minutes; then sprinkle a little water over the same and smooth it with a spatula, after which dry it thoroughly in a common Japanese oven. If a smoother surface be desired, apply another very thin coat of the same composition made somewhat thinner with spirits of turpentine to fill up all interstices that may remain; then dry as above mentioned. Finally, rub it slightly with finely-pulverized pumice-stone applied with a wet woolen cloth; then wash and dry it, and it is ready for use. It may be framed, if desired.

What I claim as my invention, and desire to secure by Letters Patent, is—

A wooden writing-slate of a variety of colors formed by the application of the composition herein described to smooth surfaces of wood of any desired size and thickness.

JOHN STREET.

Witnesses:
   WILLIAM FOERING,
   CALE PELTON.